(12) United States Patent
Baker et al.

(10) Patent No.: US 7,760,679 B2
(45) Date of Patent: Jul. 20, 2010

(54) RADIO COMMUNICATION SYSTEM

(75) Inventors: Matthew P. J. Baker, Canterbury (GB); Timothy J. Moulsley, Caterham (GB)

(73) Assignees: Koninklijke Philips Electronics N.V., Eindhoven (NL); Sharp Corporation, Osaka (JP)

( * ) Notice: Subject to any disclaimer, the term of this patent is extended or adjusted under 35 U.S.C. 154(b) by 1154 days.

(21) Appl. No.: 10/556,007

(22) PCT Filed: May 6, 2004

(86) PCT No.: PCT/IB2004/001544

§ 371 (c)(1),
(2), (4) Date: Nov. 8, 2005

(87) PCT Pub. No.: WO2004/102828

PCT Pub. Date: Nov. 25, 2004

(65) Prior Publication Data

US 2007/0054689 A1 Mar. 8, 2007

(30) Foreign Application Priority Data

May 13, 2003 (GB) ................. 0310948.5
Oct. 3, 2003 (GB) ................. 0323191.7

(51) Int. Cl.
*H04B 7/185* (2006.01)
(52) U.S. Cl. ................ 370/318; 455/13.4; 455/522
(58) Field of Classification Search ........... 370/318, 370/331; 455/436, 522, 13
See application file for complete search history.

(56) References Cited

U.S. PATENT DOCUMENTS

| 6,829,226 | B1 * | 12/2004 | Apostolides et al. ........ 370/318 |
| 2001/0004374 | A1 * | 6/2001 | Kono ........................ 375/130 |
| 2002/0016179 | A1 * | 2/2002 | Baker et al. ................. 455/522 |
| 2003/0087605 | A1 * | 5/2003 | Das et al. ................... 455/67.1 |
| 2003/0123396 | A1 * | 7/2003 | Seo et al. .................... 370/252 |
| 2004/0246917 | A1 * | 12/2004 | Cheng et al. ................ 370/328 |
| 2005/0289256 | A1 * | 12/2005 | Cudak et al. ................. 710/62 |

FOREIGN PATENT DOCUMENTS

| EP | 1079541 A1 | 2/2001 |
| EP | 1309121 A1 | 5/2003 |

OTHER PUBLICATIONS

ISR of International Application PCT/IB2004/001544 Contained in International Publication No. WO2004/102828.
Written Opinion of the International Searching Authority for International Application No. PCT/IB2004/001544.

* cited by examiner

*Primary Examiner*—Rafael Pérez-Gutiérrez
*Assistant Examiner*—Marcos Batista

(57) ABSTRACT

A radio communication system (50) which uses a transmit power control loop to adjust downlink (160) transmit power from a base station (100) to a mobile station (200) and periodic reports of downlink channel quality (CQI) transmitted by the mobile station (200) on an uplink (260) to select a downlink transmission parameter, temporarily transmits additional CQI reports in response to an interruption in the transmit power control loop or the CQI reporting.

42 Claims, 3 Drawing Sheets

RADIO COMMUNICATION SYSTEM

The present invention relates to a radio communication system, a mobile station and a base station for use in such a system, and to a method of operating such a system.

In a radio communication system comprising base stations of fixed location and mobile stations, transmissions from a base station to a mobile station take place on a downlink channel and transmissions from a mobile station to a base station take place on an uplink channel. It is known for such systems to use transmission format control in which a mobile station measures the quality of a received downlink signal and transmits reports of the quality (typically referred to as Channel Quality Information (CQI) reports) to a base station, and the base station then schedules packet transmissions to certain mobile stations and selects a transmission format, for example modulation and coding scheme, suitable for optimising communication under the prevailing channel conditions. Such CQI reports may provide an indication of, for example, carrier to interference ratio, signal to noise ratio, delay spread, or a recommended transmission format suited to the prevailing channel conditions.

Also, it is known to use closed loop transmit power control in which a mobile station measures the quality of a received downlink signal and transmits transmit power control (TPC) commands to the base station so that an adequate, but not excessive, received signal level is maintained at the mobile station despite fluctuations in downlink channel conditions.

Typically, the quality measurements used for generating the CQI reports are made on a downlink signal whose transmit power is not varied by a closed loop power control process, but the quality measurements used for generating the TPC have to be made on a downlink signal whose transmit power is varied as a result of the TPC commands, in order to achieve closed loop operation.

Furthermore, it is known to use open loop transmit power control in which the base station measures the quality of a received uplink signal, estimates the attenuation occurring on the uplink, and adjusts the downlink transmit power on the assumption that the attenuation on the downlink is similar to the uplink.

There is a requirement to permit interruptions in the power control process, for example, to enable the mobile station to make measurements on other channels in preparation for handover to another system. During such an interruption the open or closed transmit power control loop may be broken. The transmit power control loop is re-established when the uplink transmission (and downlink transmission in the case of closed loop power control) resumes after the interruption.

The CQI reports are generally transmitted at a lower rate than the TPC commands and so the TPC commands can additionally be used by the base station to assist scheduling of transmissions and selection of a transmission format. However, as a result of the interruption in the power control process, the transmit power may temporarily be non-optimal, which may consequently result in packets being scheduled to the mobile stations with a poor channel quality or an unsuitable transmission format being used temporarily. Transmission of data using an unsuitable transmission format may be unreliable if the transmission format is insufficiently robust, or waste resources if the transmission format is unnecessarily robust. Alternatively, transmission of data could be deferred until the power control process resumes and has re-converged. In either case, system capacity may be wasted resulting in inefficiency.

An object of the present invention is to contribute to improved efficiency.

According to a first aspect of the present invention there is provided a mobile station for use in a communication system having a base station, the mobile station comprising power control signal generation means for generating a power control signal for enabling the base station to adjust its transmit power level in accordance with a power control loop process, report generation means for generating reports from measurements of a characteristic of a signal received from the base station, transmitter means for transmitting the reports and the power control signal to the base station, and transmission control means adapted to control the time of transmission of the reports such that first of the reports are transmitted at a predetermined sequence of times and, in response to an interruption in the power control loop or the reporting, and for a period existing at least one of before, during and after the interruption, one or more second of the reports are transmitted at times not coincident with the predetermined times.

The interruption in the reporting may be an interruption in the report generation, or an interruption in the transmission of the reports, or an interruption in the reception of the reports by the base station which may be detected by the mobile station.

By transmitting CQI reports at non-predetermined times for a period when an interruption occurs, the reporting of the downlink quality to the base station is improved. Reports can be transmitted closer to the interruption than the predetermined times, and additional reports can be transmitted. As a result, the base station can improve its selection of downlink parameters thereby improving packet scheduling and improving the selection of an appropriate transmission format until the power control process is re-established. Subsequent reversion to a lower rate avoids excessive signalling, thereby minimising power consumption and interference.

According to a second aspect of the present invention there is provided a radio communication system comprising a base station and at least one mobile station in accordance with the first aspect of the invention.

According to a third aspect of the present invention there is provided a method of operating a radio communication system having a base station and a mobile station, comprising, at the mobile station, generating a power control signal for enabling the base station to adjust its transmit power in accordance with a power control loop process, transmitting the power control signal to the base station, generating reports from measurements of a characteristic of a signal received from the base station, and transmitting the reports to the base station, interrupting the power control loop or the reporting and, at the mobile station, controlling the time of transmission of the reports such that first of the reports are transmitted at a predetermined sequence of times and, in response to the interruption, and for a period existing at least one of before, during and after the interruption, second of the reports are transmitted at times not coincident with the predetermined times.

According to a fourth aspect of the invention there is provided a base station for use in a radio communication system, comprising transmitter power control means for, in response to a first signal received from a mobile station, setting the transmit power level of a first transmitted signal in accordance with a power control loop process, control means for selecting, in response to reports received from the mobile station at a predetermined sequence of times, a parameter of a second transmitted signal, and scheduling means for scheduling an interruption in the power control loop process or the reporting, and indicating means for generating for transmission to the mobile station in response to the interruption an indication of one or more further reports to be transmitted for a period at times not coincident with the predetermined times .

Embodiments of the present invention will now be described, by way of example only, with reference to the accompanying drawings, wherein.

Figure 1:
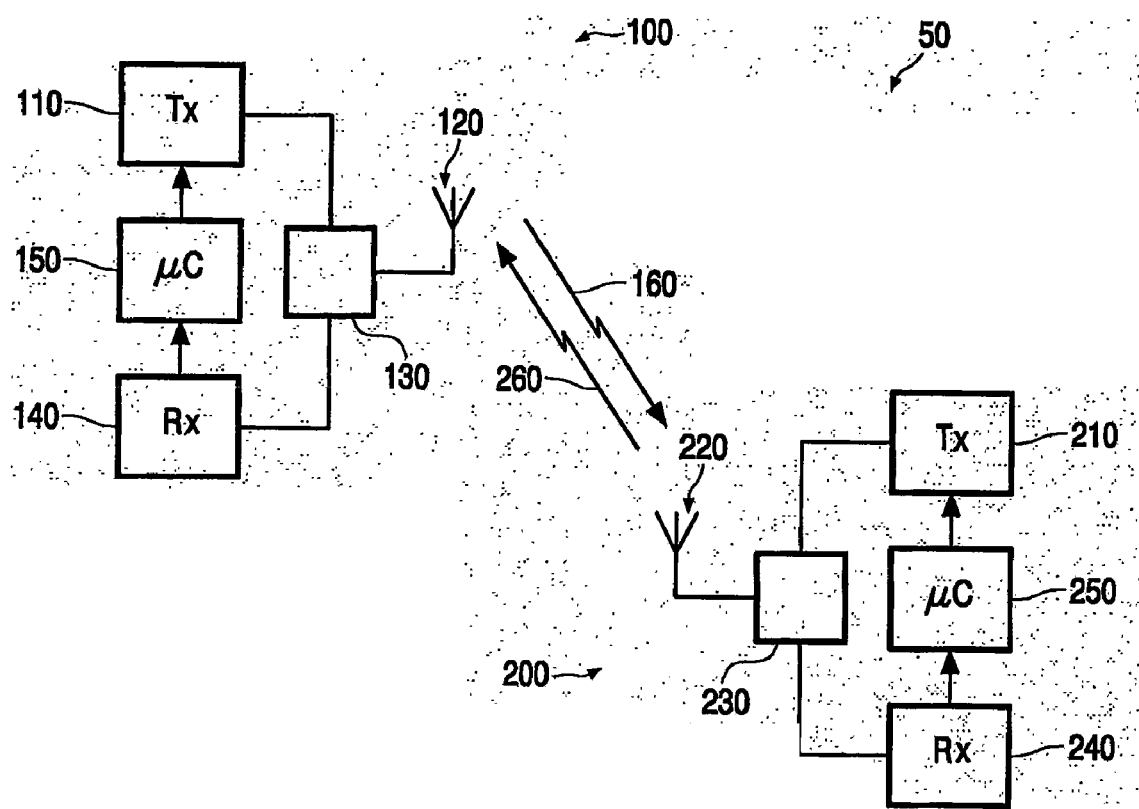
FIG. 1 is a block schematic diagram of a radio communication system.

Referring to FIG. 1, there is illustrated a radio communication system 50 comprising a base station 100 and a plurality of mobile stations 200. Transmission from base station 100 to the mobile stations 200 takes place on a downlink channel 160, and transmission from the mobile stations 200 to the base station 100 takes place on an uplink channel 260.

The base station 100 comprises a transmitter means 110 having an output coupled to an antenna means 120 via coupling means 130 which may be, for example, a circulator or changeover switch. The coupling means 130 also couples signals received by the antenna means 120 to an input of a receiver means 140. Coupled to the transmitter means 110 and the receiver means 140 is a control means (μC) 150 for:

generating a control signal for transmission on the downlink, the transmit power of this control signal not being controlled by a power control loop;

setting the transmit power level of a downlink signal, for example a data signal, in response to TPC commands received on the uplink from the mobile station 200;

selecting a transmission format for a downlink signal, for example a data signal, in response to CQI reports received from the mobile station 200; and scheduling interruptions in the TPC process and generating indications of the occurrence of the interruptions for transmission to the mobile station 200.

Each mobile station 200 comprises a transmitter means 210 having an output coupled to an antenna means 220 via coupling means 230 which may be, for example, a circulator or changeover switch. The coupling means 230 also couples signals received by the antenna means 220 to an input of a receiver means 240. Coupled to the transmitter means 210 and the receiver means 240 is a control means (μC) 250 for:

measuring a downlink signal, for example a data signal, received from the base station and generating TPC commands in accordance with a closed loop power control process;

measuring a characteristic of the received control signal and, from the measurements, generating CQI reports for transmission to the base station 100; and controlling the time at which the CQI reports are transmitted such that reports are transmitted at a predetermined sequence of times and, in response to an indication of occurrence of an interruption, one or more report are transmitted at times not coincident with the predetermined times, such reports being referred to for convenience in the present specification as non-predetermined reports.

Figure 2:
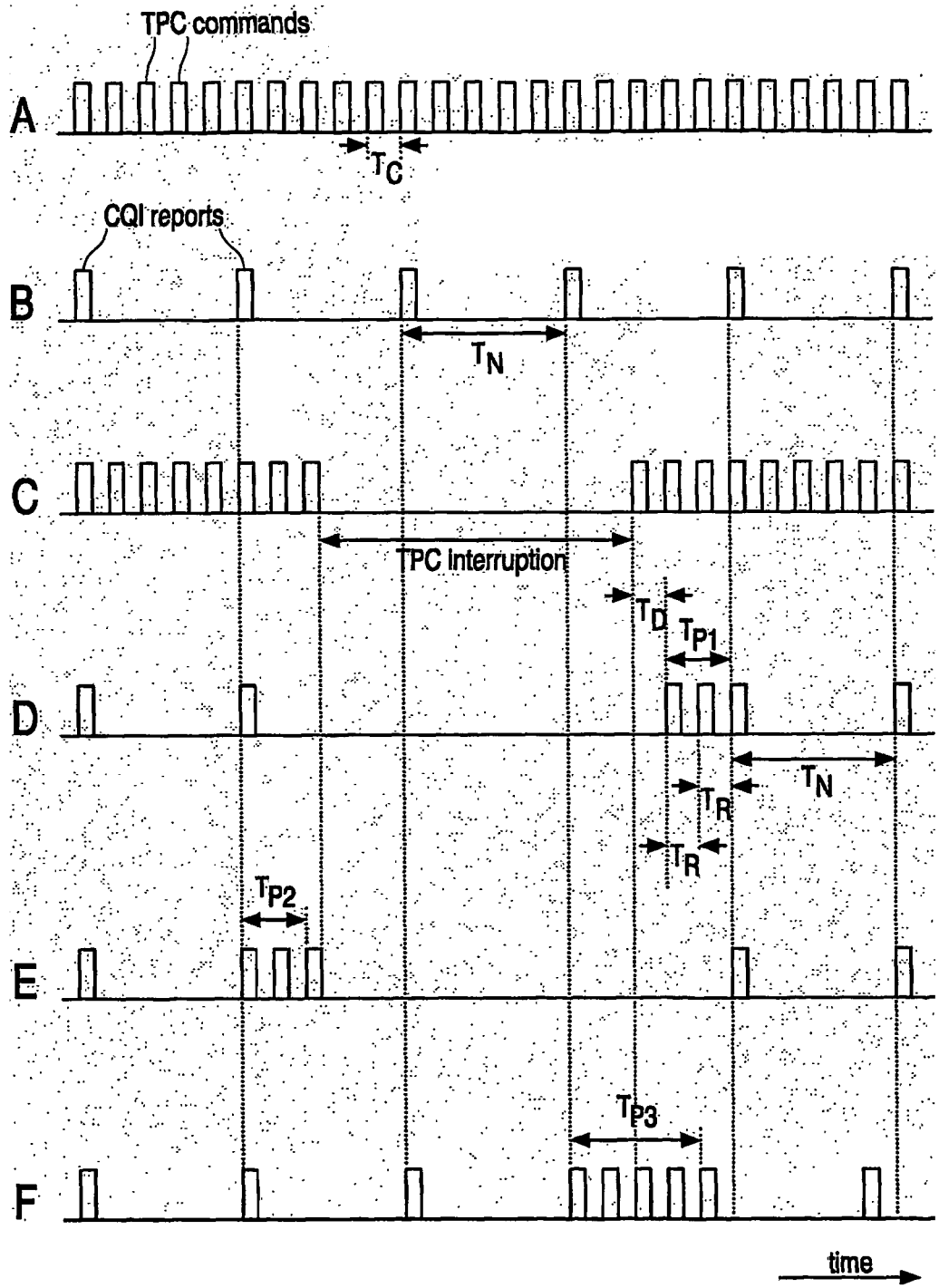
FIG. 2 illustrates diagrammatically options for operation in accordance with the invention.

There are several options for the time at which the period of transmission of non-predetermined reports may start. Also, there are several options for the time at which the period of transmission of non-predetermined reports may terminate. These options are explained in turn below with reference to FIG. 2. FIG. 2A illustrates the transmission of TPC commands regularly at an interval $T_c$ where no interruption occurs in the power control process. FIG. 2B illustrates the transmission of CQI reports regularly at a predetermined sequence of times spaced at an interval $T_N$ where no interruption occurs. FIG. 2C illustrates the transmission of TPC commands with an interruption in the power control process which results in a break in the transmission of TPC commands.

Options for starting the period of transmission of non-predetermined reports are as follows:

a) The period may start after the interruption has terminated, as illustrated in FIG. 2D where the reduced interval is $T_R$, and the period commences after a delay $T_D$ from the termination of the interruption.

b) The period may start before the interruption is started as illustrated in FIG. 2E, or at the same time as the interruption starts.

c) The period may start during the interruption, as illustrated in FIG. 2F.

During the interruption, the transmission of CQI reports may continue as illustrated in FIGS. 2F, or may be suspended as illustrated in FIGS. 2D, 2E, depending on, for example, the capability of the mobile station 200 and the purpose of the interruption.

Options for terminating the period of transmission of non-predetermined reports are as follows:

a) Where the period starts before the interruption starts, the period may also terminate before, or at the same time as, the interruption starts, or may terminate during the interruption or after, or at the same time as, the interruption is terminated. FIG. 2E illustrates the period starting before the interruption and ending at the same time as the interruption starts. In this example, the duration of the period is $T_{P2}$ and two additional CQI reports are transmitted at non-predetermined times before the interruption; the transmission of CQI reports is suspended during the interruption, but the additional CQI reports provide additional information to assist the base station.

b) Where the period starts during the interruption, the period may also terminate during, or at the same time as, the interruption (this option is not illustrated in FIG. 2) or after the interruption, as illustrated in FIG. 2F which shows the duration of the period is $T_{P3}$ and four additional CQI reports are transmitted at non-predetermined times.

c) Where the period starts after the interruption is terminated as illustrated in FIG. 2D, or at the same time as the interruption is terminated, the period must of course terminate after the interruption is terminated. In FIG. 2D the duration of the period is $T_{P1}$.

Some examples of options for determining the duration of the period of transmission of non-predetermined reports are as follows:

a) The duration may have a predetermined value.

b) The period may continue until the power control process has resumed after the interruption and the power control loop has converged in accordance with a predetermined criterion. The convergence may be detected by the control means 150 of the base station 100 and signalled to the mobile station. Alternatively, the convergence may be detected by the control means 250 of the mobile station 200. Convergence may be detected, for example, by a reversal of the sign of one or more TPC commands.

Any of the start time, end time and duration of the period of transmission of non-predetermined reports may be dependent on the length of the interruption to the power control loop, for example where the interruption is short, a short period of reduced interval may be used before the interruption, and where the interruption is long, a long period may be used after the interruption.

Any of those CQI reports that are separated, as a result of the non-predetermined reports, from another CQI report by the reduced interval $T_R$ may be generated from a measurement of shorter duration than is used to generate other reports. For example, the maximum measurement duration may be $T_R$ where the interval has the reduced value $T_R$, whereas those CQI reports spaced at the normal, longer interval $T_N$ may be derived from longer measurements. The measurement may, depending on the capability of the mobile station 200 and the purpose of the interruption, be prevented from starting until the interruption has terminated. So, for example, in FIG. 2D the maximum duration of the measurement used to generate the first CQI report transmitted after the end of the interruption may be $T_D$, or shorter than $T_D$ if some processing time is required between completion of the measurement and the start of transmission of the corresponding report.

If the measurement is started during the interruption, any other measurements during the interruption, such as examination of channels on another system in preparation for handover, may be curtailed in order to allow time for making a measurement from which a CQI report is generated. There may be a trade-off between accuracies of these two types of measurement in order to establish the optimum division of the available time.

Optionally, CQI reports transmitted at non-predetermined times or at different intervals may also be coded differently from the other reports.

In FIGS. 2D and 2E, where the period of transmission of non-predetermined reports has terminated and the normal, longer interval $T_N$ has resumed with the transmission of CQI reports at only the predetermined times, the timing of the CQI reports is illustrated as being the same as if the interruption had not occurred, as in FIG. 2B. However this same timing is not essential and the CQI reports may be displaced by a time shift applied to the predetermined sequence of times for the transmission of subsequent reports, as illustrated in FIG. 2F where the time of occurrence of the final two reports shown in the drawing is advanced compared with the initial sequence of predetermined times sown in FIG. 2B.

Figure 3:
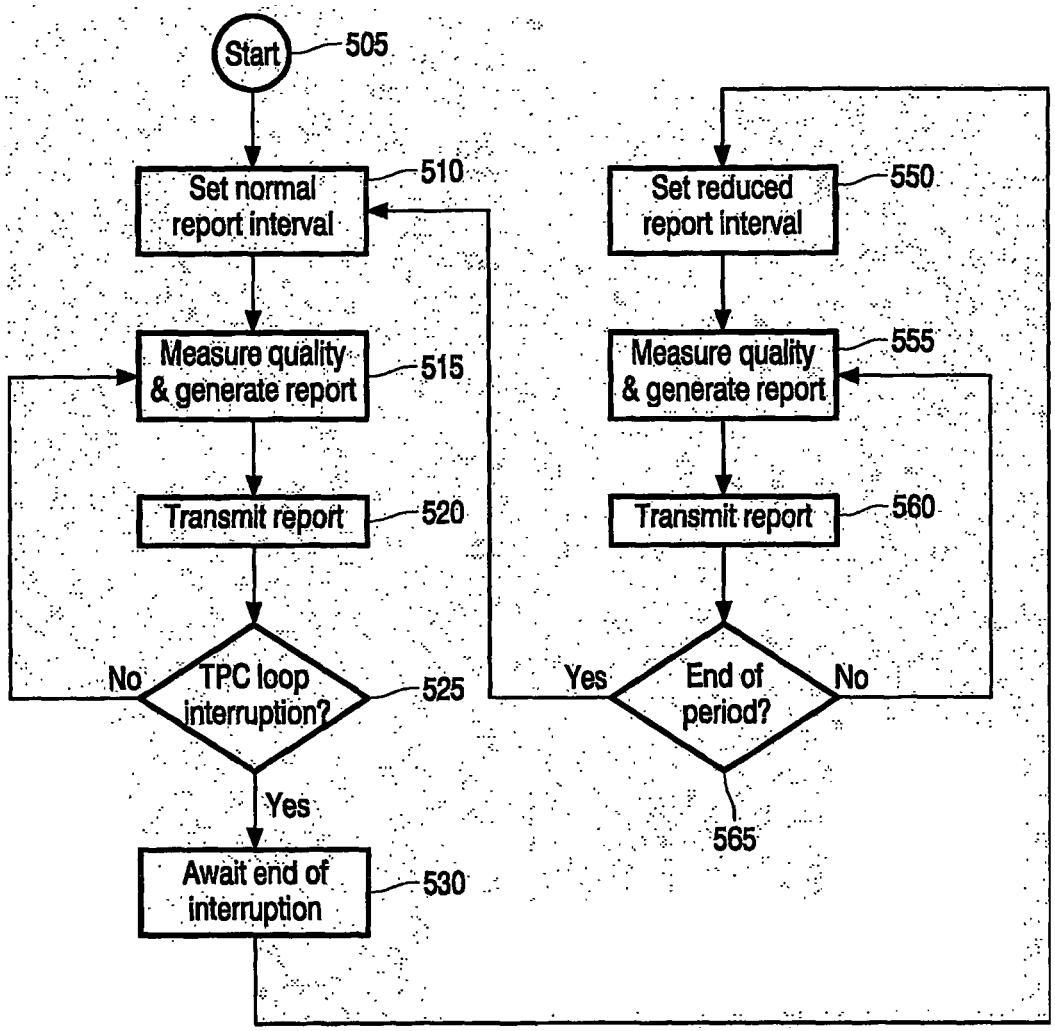
FIG. 3 is a flow chart illustrating a method of operating a communication system in accordance with the invention.

FIG. 3 is a flow chart illustrating a method of operating a communication system made in accordance with the invention. The method starts at step 505. At step 510 the mobile station 200 sets (may be in response to an instruction from the base station 100) the current CQI reporting interval to $T_N$ and commences (or continues if already in progress) transmission of the periodic TPC commands at an interval $T_c$.

At step 515 the mobile station 200 measures a characteristic of the received control signal and generates from the measurement a CQI report.

At step 520 the mobile station 200 transmits the CQI report at a time determined by the current reporting interval $T_N$, which is in turn determined by the predetermined sequence of times.

At step 525 the mobile station 200 tests whether the power control loop is interrupted, or an interruption is imminent. If the power control loop is not interrupted and no interruption is imminent, flow returns to step 515. If the power control loop is interrupted, or interruption is due before the next CQI report is due to be transmitted, flow proceeds to step 530 where transmission of TPC commands and CQI reports is suspended for the duration of the interruption as illustrated in FIG. 2D. Flow proceeds to step 550 when the interruption terminates.

At step 550 the mobile resumes transmission of TPC commands and sets the current CQI reporting interval to a reduced value $T_R$ ($T_R<T_N$), thereby introducing reports at times not concident with the predetermined times.

At step 555 the mobile station measures a characteristic of the received control signal and generates from the measurement a CQI report. At step 560 the mobile station 200 transmits the CQI report at a time determined by the current reporting interval, now $T_R$.

At step 565 the mobile station 200 tests whether the period, $T_{P1}$ in FIG. 2D, for which the CQI reporting interval is reduced has expired. If this period has not expired flow returns to step 555. If this period has expired flow returns to step 510 where the current CQI reporting interval is reset to the longer value $T_N$, thereby restoring transmission of reports at the predetermined times.

Throughout the process described above with reference to FIG. 3, the base station 100, in response to receiving the CQI reports, may adapt a parameter of a downlink transmission to suit the prevailing conditions.

Optionally, the base station 100 may detect the transmission of the non-predetermined reports at times not coincident with the predetermined times by monitoring the intervals between CQI reports.

Optionally, the mobile station 200 may signal to the base station 100 a change in the interval between, or times of transmission of, the CQI reports to assist the base station 100 receiving the CQI reports.

Optionally, the base station 100, in response to an interruption to the power control loop, may signal to the mobile station 200 an indication of a change in the interval between the CQI reports or of non-predetermined reports to be transmitted by the mobile station 200.

Optionally, only one non-predetermined CQI report may be transmitted before the transmission of reports at the sequence of predetermined times is restored.

The embodiments described above use a closed loop power control process. However, an open loop power control process can be used instead. In this case the mobile station does not transmit TPC commands, but instead transmits a signal on which the base station can make measurements and estimate a suitable downlink transmit power.

The interruption to the power control loop may be for a variety of reasons. For example, in the case of a closed loop power control process, the mobile station 200 may not be able to transmit TPC commands temporarily, as illustrated in FIG. 2C, or may not be able to receive the downlink signal temporarily from which it generates the TPC commands, so is unable to transmit effective TPC commands. In the case of an open loop power control process, the mobile station 200 may not be able to transmit an uplink signal temporarily, so the base station 100 may not be able to select an appropriate downlink transmit power level.

Instead of the power control loop being interrupted, the interruption may be to the CQI reporting process. For example, there may be a requirement to interrupt the transmission of CQI reports while the mobile station transmits another signal. The motivation for such a requirement may be, for example, the making available of sufficient transmission power for the other signal to be transmitted successfully, or the avoidance of large peak-to-average power ratios in the transmitted signal of the mobile station, or the reduction of interference to the other transmission. As another example, the transmission of CQI reports may be interrupted while the mobile station is unable to make the corresponding measurements, or the reception of CQI reports may be interrupted while the base station is unable to receive them. As a further example, the interruption to reporting may occur when one or more uplink or downlink transmission parameters are reconfigured. When interruptions to the CQI reporting occurs, according to the present invention one or more CQI reports are transmitted at non-predetermined times after the interruption. As a result, the base station can improve its selection of downlink parameters. The options described with respect to the invention are available whether the interruption occurs to the power control process or to the CQI reporting.

In the embodiments described with reference to FIG. 2, the duration of the reduce interval $T_R$ is the same for each of the CQI reports transmitted with a reduced interval. However, each reduced interval need not have an identical duration.

The functionality of the base station 100 may be distributed across a variety of fixed parts of a communications network. In this specification, the use of the term "base station" is therefore to be understood to include those parts of a communication network involved in an embodiment of the present invention.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of communication systems and component parts thereof, and which may be used instead of or in addition to features already described herein.

The invention claimed is:

1. A mobile station for use in a communication system having a base station, the mobile station comprising
   power control signal generation means for generating a power control signal for enabling the base station to adjust its transmit power level in accordance with a power control loop process,
   report generation means for generating reports from measurements of a characteristic of a signal received from the base station,
   transmitter means for transmitting the reports and the power control signal to the base station, and
   transmission control means adapted to control a time of transmission of the reports such that first of the reports are transmitted at a predetermined sequence of times and, in response to an interruption in the power control loop process, and for a period existing at least one of before, during and after the interruption, to control a time of transmission of one or more second of the reports at times that are not coincident with the predetermined times.

2. A mobile station as claimed in claim 1, wherein the power control signal comprises power control commands.

3. A mobile station as claimed in claim 1, wherein the report generation means is adapted to generate at least one of the second reports from a measurement of shorter duration than a measurement duration used to generate the first reports.

4. A mobile station as claimed in claim 1, wherein the report generation means is adapted to generate an earliest report transmitted after an end of the interruption from a measurement commenced before the end of the interruption.

5. A mobile station as claimed in claim 1, wherein the transmission control means is adapted to select, in response to an indication of a length of the interruption, a start time of the period for which the second reports are transmitted.

6. A mobile station as claimed in claim 1, wherein the transmission control means is adapted to select, in response to an indication of a length of the interruption, a duration of the period for which the second reports are transmitted.

7. A mobile station as claimed in claim 1, wherein the transmission control means is adapted to select, in response to an indication of a length of the interruption, a number of the second reports to be transmitted in the period.

8. A mobile station as claimed in claim 1, wherein a duration of the period for which the second reports are transmitted is predetermined.

9. A mobile station as claimed in claim 1, wherein a number of the second reports transmitted in the period is predetermined.

10. A mobile station as claimed in claim 1, wherein the period terminates when a next predetermined time occurs.

11. A mobile station as claimed in claim 1, wherein the transmission control means is adapted to terminate the period in response to an indication of convergence of the power control loop process.

12. A mobile station as claimed in claim 11, wherein the indication of convergence is a signal received from the base station.

13. A mobile station as claimed in claim 11, wherein the transmitter control means is adapted to generate the indication of convergence in accordance with a predetermined criterion.

14. A mobile station as claimed in claim 13, wherein the predetermined criterion includes a reversal of the sign of at least one power control command.

15. A mobile station as claimed in claim 1, wherein the report generation means is adapted to suspend generation of the first reports during the interruption.

16. A mobile station as claimed in claim 1, wherein the transmission control means is adapted to, after one or more second reports have been transmitted, apply a time shift to the predetermined sequence of times for the transmission of subsequent first reports.

17. A radio communication system comprising a base station and at least one mobile station as claimed in claim 1.

18. A method of operating a radio communication system having a base station and a mobile station, comprising, at the mobile station,
    generating a power control signal for enabling the base station to adjust its transmit power in accordance with a power control loop process,
    transmitting the power control signal to the base station,
    generating reports from measurements of a characteristic of a signal received from the base station, and
    transmitting the reports to the base station,
    interrupting the power control loop process, and,
    at the mobile station, controlling the time of transmission of the reports such that first of the reports are transmitted at a predetermined sequence of times and, in response to the interruption, and for a period existing at least one of before, during and after the interruption, second of the reports are transmitted at times not coincident with the predetermined times.

19. A method as claimed in claim 18, wherein the power control signal comprises power control commands.

20. A method as claimed in claim 18, wherein at least one of the second reports is generated from a measurement of shorter duration than a measurement duration used to generate the first reports.

21. A method as claimed in claim 18, wherein an earliest report transmitted after an end of the interruption is generated from a measurement commenced before the end of the interruption period.

22. A method as claimed in claim 18, comprising selecting, in response to an indication of a length of the interruption, a start time of the period for which the second reports are transmitted.

23. A method as claimed in claim 18, comprising selecting, in response to an indication of a length of the interruption, the duration of the period for which the second reports are transmitted.

24. A method as claimed in claim 18, comprising selecting, in response to an indication of a length of the interruption, the number of the second reports transmitted in the period.

25. A method as claimed in claim 18, wherein a duration of the period for which the second reports are transmitted is predetermined.

26. A method as claimed in claim 18, wherein a number of the second reports transmitted in the period is predetermined.

27. A method as claimed in claim 18, wherein the period terminates when a next predetermined time occurs.

28. A method as claimed in claim 18, comprising terminating the period for which the second reports are transmitted in response to an indication of convergence of the power control loop process.

29. A method as claimed in claim 28, comprising generating the indication of convergence at the base station in accordance with a predetermined criterion and transmitting the indication of convergence from the base station to the mobile station.

30. A method as claimed in claim 28, comprising generating the indication of convergence at the mobile station in accordance with a predetermined criterion.

31. A method as claimed in claim 29, wherein the predetermined criterion is a reversal of a sign of at least one power control command.

32. A method as claimed in claim 18, comprising suspending the generating of the first reports during the interruption.

33. A method as claimed in claim 18, comprising, after one or more second reports have been transmitted, applying a time shift to the predetermined sequence of times for the transmission of subsequent first reports.

34. A base station for use in a radio communication system, comprising:
    transmitter power control means for, in response to a first signal received from a mobile station, setting a transmit power level of a first transmitted signal in accordance with a power control loop process,
    control means for selecting, in response to reports received from the mobile station at a predetermined sequence of times, a parameter of a second transmitted signal,
    scheduling means for scheduling an interruption in the power control loop process or the reports received from the mobile station, and
    indicating means for generating for transmission to the mobile station in response to the interruption, an indication of one or more further reports to be transmitted for a period at times not coincident with the predetermined times.

35. A base station as claimed in claim 34, wherein the first signal received includes a transmit power control command.

36. A base station as claimed in claim 34, wherein the indication comprises at least one of a start time, end time and duration of the period.

37. A base station as claimed in claim 34, wherein the scheduling means is adapted to determine an end time of the period in response to an indication of convergence of the power control loop process.

38. A base station as claimed in claim 34, wherein the scheduling means is adapted to determine at least one of a start time, end time and duration of the period to be dependent on a length of the scheduled interruption.

39. A mobile station for use in a communication system having a base station, the mobile station comprising:
    a receiver;
    a controller that is configured to:
        generate power control signals that enable the base station to adjust its transmit power level in accordance with a power control loop process,
        generate reports from measurements of a characteristic of a signal received from the base station, and
        control a time of transmission of the reports; and
    a transmitter that is configured to transmit the power control signals and the reports;
    wherein the controller controls the time of transmission of the reports such that the reports are transmitted at a first rate and, in response to an interruption in the power control loop process, the reports are transmitted at a second rate that is higher than the first rate.

40. The mobile station of claim 39, wherein the controller is configured to generate at least one of the second reports from a measurement of shorter duration than a measurement duration used to generate the first reports.

41. The mobile station of claim 39, wherein the controller is configured to select, in response to an indication of a length of the interruption, at least one of: a start time of the period for which the second reports are transmitted, a duration of the period for which the second reports are transmitted, and a number of the second reports to be transmitted in the period.

42. The mobile station of claim 39, wherein the controller is configured to resume sending the reports at the first rate in response to an indication of convergence of the power control loop process.

* * * * *